(12) United States Patent
Harper

(10) Patent No.: US 6,781,094 B2
(45) Date of Patent: Aug. 24, 2004

(54) ANALYSIS OF MEMS MIRROR DEVICE USING A LASER FOR MIRROR REMOVAL

(75) Inventor: Curtis R. Harper, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/331,853

(22) Filed: Dec. 30, 2002

(65) Prior Publication Data

US 2004/0124186 A1 Jul. 1, 2004

(51) Int. Cl.⁷ .............................................. B23K 26/00
(52) U.S. Cl. ............................ 219/121.72; 219/121.69; 219/121.85
(58) Field of Search ....................... 219/121.72, 121.69, 219/121.85, 121.67, 121.68, 121.81; 257/414; 359/577

(56) References Cited

U.S. PATENT DOCUMENTS

| | | | | |
|---|---|---|---|---|
| 6,545,758 B1 | * | 4/2003 | Sandstrom | 356/317 |
| 2002/0126387 A1 | * | 9/2002 | Ishikawa et al. | 359/578 |
| 2002/0127760 A1 | * | 9/2002 | Yeh et al. | 438/50 |
| 2002/0135033 A1 | * | 9/2002 | Hara et al. | 257/432 |
| 2002/0186359 A1 | * | 12/2002 | Meisburger et al. | 355/69 |

* cited by examiner

Primary Examiner—M. Alexandra Elve
(74) Attorney, Agent, or Firm—Charles A. Brill; Wade James Brady, III; Frederick J. Telecky, Jr.

(57) ABSTRACT

A method of analyzing a MEMS device having micromirrors. A laser is targeted on one or more mirror elements and used to remove only the mirror. Once the mirror is removed, the underlying structure can be observed in operation, measured, elementally analyzed, or undergo other types of analysis.

14 Claims, 6 Drawing Sheets

| SAMPLE ID | C1 [0.076] | O1 [0.212] | F1 [0.513] | Al2 [0.105] | Si2 [0.071] | Ti2 [0.296] |
|---|---|---|---|---|---|---|
| POINT 1 | 30.91 | 43.22 | 1.73 | 10.81 | 11.58 | 1.75 |
| POINT 2 | 30.25 | 42.76 | 1.27 | 10.15 | 13.90 | 1.67 |
| POINT 3 | 35.99 | 40.99 | 1.72 | 11.98 | 8.12 | 1.20 |
| POINT 4 | 31.82 | 41.14 | 1.86 | 12.62 | 10.95 | 1.61 |

ANALYSIS OF MEMS MIRROR DEVICE
USING A LASER FOR MIRROR REMOVAL

TECHNICAL FIELD OF THE INVENTION

This invention relates to micro-electromechanical devices, and more particularly to a method of analyzing and testing MEMS devices having one or more micromirrors.

BACKGROUND OF THE INVENTION

A Digital Micromirror Device™ (DMD™) is a type of microelectromechanical systems (MEMS) device. Invented in the 1980's at Texas Instruments Incorporated, the DMD is a fast, reflective digital light switch.

The DMD has a variety of applications, such as imaging systems and optical switching. For imaging systems, the DMD is combined with image processing, memory, a light source, and optics to form a digital light processing system capable of projecting large, bright, high-contrast color images.

DMD's may have a variety of designs, and the most popular design in current use is a structure consisting of a mirror that is rigidly connected to an underlying yoke. The yoke in turn is connected by two thin, mechanically compliant torsion hinges to support posts that are attached to the underlying substrate. Electrostatic fields developed between the underlying memory cell and the yoke and mirror cause rotation in the positive or negative rotation direction.

The fabrication of the above-described DMD structure begins with a completed CMOS memory circuit. Through the use of successive photomask layers, the structure is formed with alternating layers of metal for the address electrode, hinge, yoke, and mirror layers. Hardened photoresist forms sacrificial layers that are eventually removed to form air gaps.

Testing and development of DMD devices is facilitated by the ability to inspect the structure underlying the mirrors. In the past, the mirrors were removed using tape or epoxy. However, these methods of removal can break or contaminate the underlying structure, making it difficult to discern defects.

SUMMARY OF THE INVENTION

One aspect of the invention is a method of inspecting a target mirror element of a MEMS mirror device. First, one or more mirrors to be removed are selected. Then, a laser is used to remove the selected one or more mirrors. Once the mirror is removed, the underlying structure is visually available for inspection and for various types of analysis. Furthermore, because the laser removal of the mirror does not affect the operation of the device, the underlying structure can be observed in operation.

An advantage of the invention is that it provides a means for removing the mirror of a DMD other MEMS mirror device without affecting the underlying structure. This permits the underlying structure to be effectively analyzed and improved.

DETAILED DESCRIPTION OF THE INVENTION

The following description is directed to removal of one or more mirrors of a MEMS device, and the subsequent structural and operational analysis of the underlying structure that may then be performed. For purposes of example, a DMD MEMS device is illustrated and described. However, there may be other types of MEMS mirror devices for which the methods described herein are useful.

Figure 1:
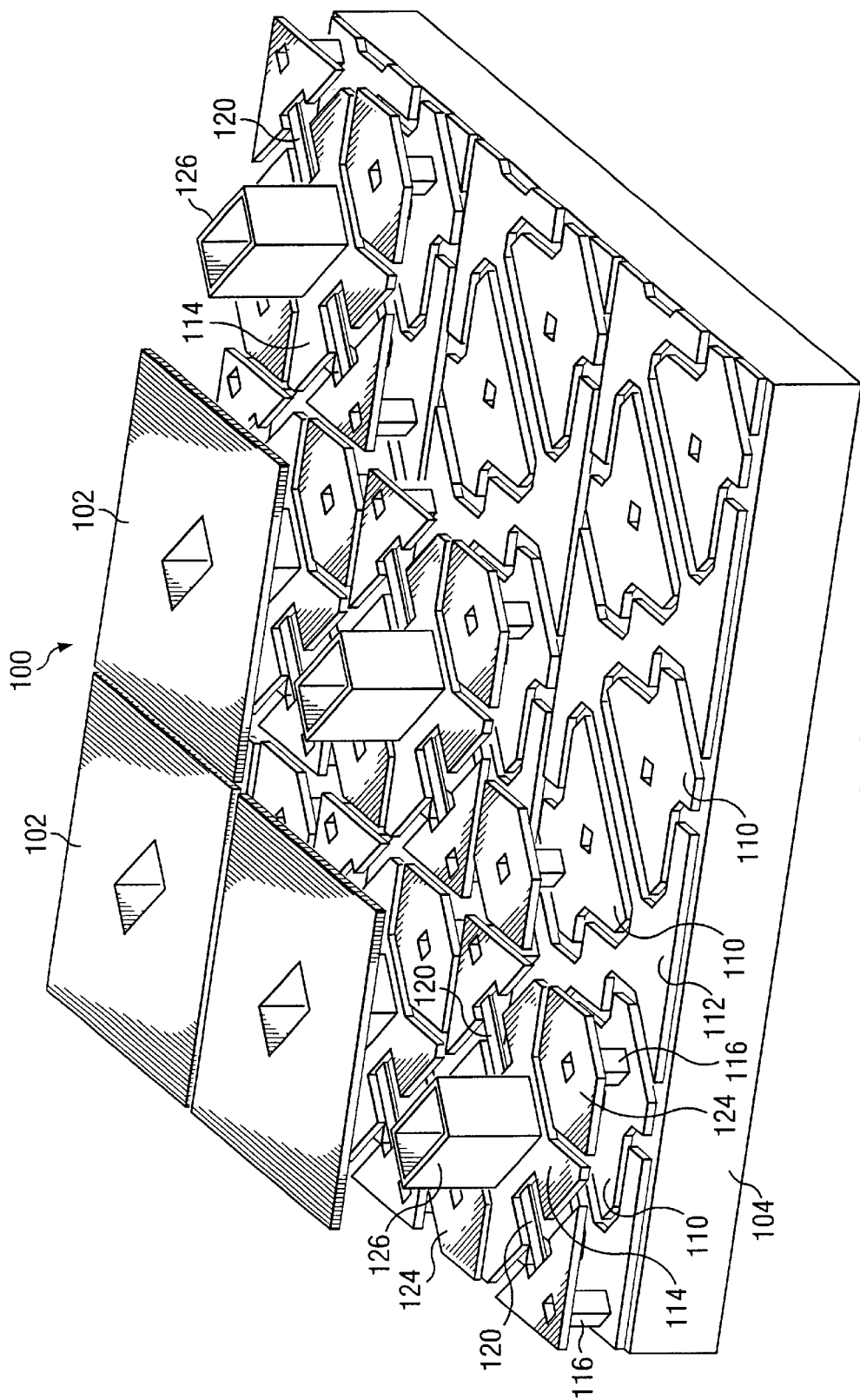
FIG. 1 illustrates a portion of a DMD array.

FIG. 1 illustrates a portion (nine micromirror elements) of a DMD array 100. A DMD array 100 typically has hundreds or thousands of rows and columns of micromirror elements. In FIG. 1, three of the nine micromirror elements have their mirrors 102 removed to show the underlying structure. Another three elements have had all of the structure removed except for an addressing layer.

Figure 2:
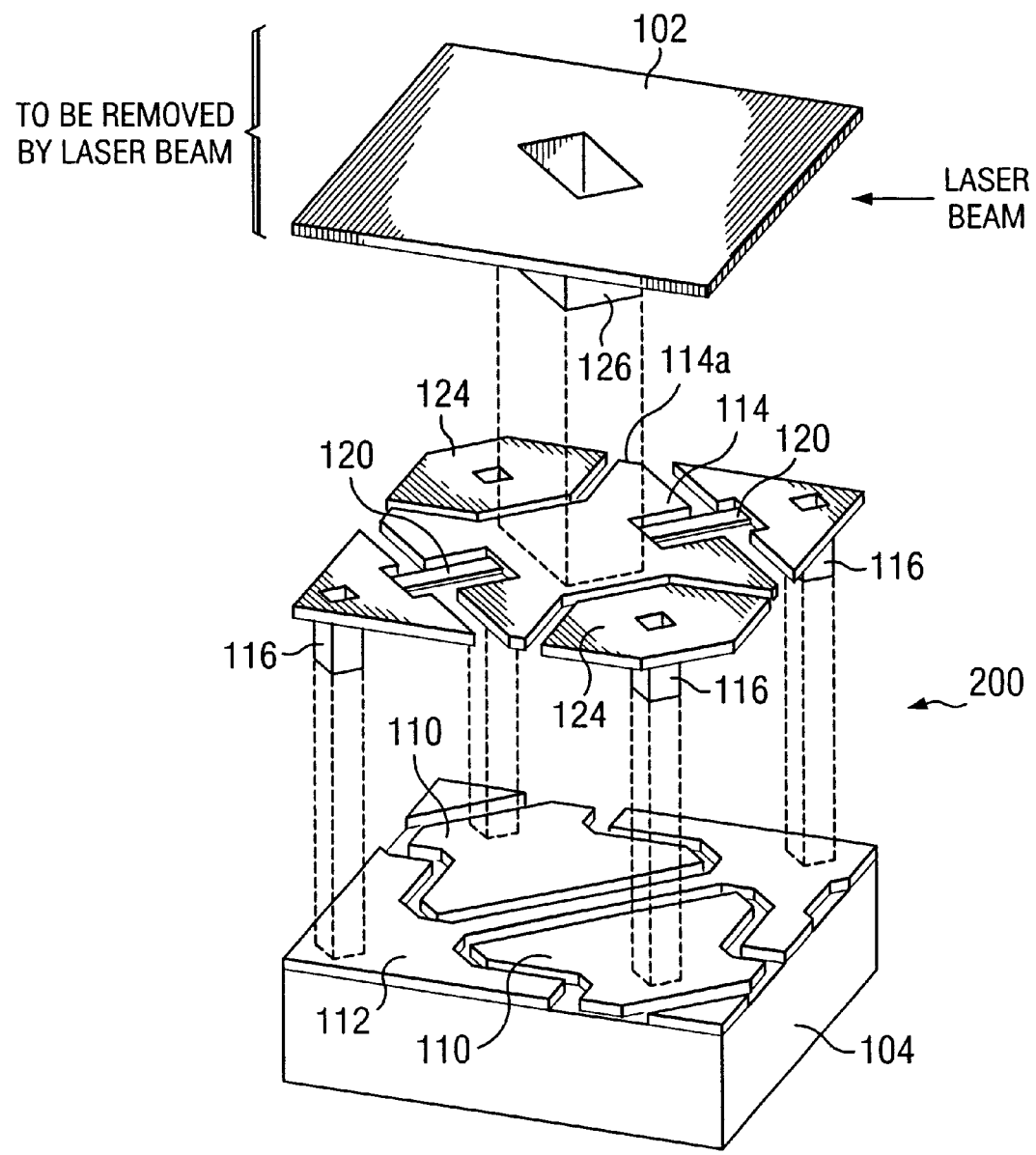
FIG. 2 is an exploded view of a DMD micromirror element from the array of FIG. 1.

FIG. 2 is an exploded view of a DMD micromirror element 200. It illustrates how the various layers interrelate, including the underlying static random access memory (SRAM) cell 104, which is used to address the pixel. As explained below, FIG. 2 further illustrates how the mirror 102 and its support via 126 may be removed by laser, leaving the underlying structure intact.

Referring to both FIGS. 1 and 2, each DMD element 200 is a monolithically integrated MEMS superstructure cell fabricated over the SRAM cell 104. Two sacrificial layers have been removed by plasma etching to produce air gaps between three metal layers of the superstructure. For purposes of this description, the three metal layers are "spaced" apart by being separated by these air gaps. The air gaps free certain parts of the structure to rotate about compliant torsion hinges 120.

The uppermost metal layer has a reflective mirror 102. The mirror 102 is connected, by means of via 126, to an underlying yoke 114, which in turn is suspended by two thin torsion hinges 120 to support posts 116. The yoke 114 is electrically connected to underlying address electrodes 110. Similarly, the mirror is electrically connected to underlying address electrodes 124. When electrostatically activated, the mirror 102 and yoke 114 rotate until the landing tips 114a of yoke 114 come to rest against stops that are at the same potential as yoke 114. The position of the stops limits the mirror rotation angle, such as to +10 or −10 degrees.

The address electrodes 110 and 114 are also electrically connected to the underlying SRAM cell 104. The yoke 114 and mirror 102 are electrically connected to a bias bus 112, which interconnects the mirrors 102 of all elements 200 to a bond pad at the chip perimeter. An off-chip driver supplies the bias waveform necessary for proper digital operation.

The DMD mirrors 102 are each 12.68 um square and made of aluminum for maximum reflectivity. They are arrayed on 13.76 um centers to form a matrix having a high fill factor (~90%). In operation, electrostatic fields are developed between the mirror 102 and its address electrodes 110, creating an efficient electrostatic torque. This torque works against the restoring torque of the hinge 120 to produce mirror rotation in the positive or negative direction.

As stated above, FIG. 2 further illustrates how a mirror 102 may be cleanly removed by using a laser. Because the metal of mirror via 126 is thin, when the mirror 102 is the target of a laser beam, the heat is not transmitted down through the bottom of the mirror via 126 into underlying structures. As a result, all the energy from the laser is absorbed in the mirror 102. The mirror 102 is vaporized into sub micron particles, which do not affect the operation of the mirror element 200. Generally, some or all of the mirror via 126 is also removed.

Once the mirror 102 is removed, the DMD 100 can be analyzed, under either static or operating conditions. For example, the landing tips 114a can be viewed during landing. Removal of a mirror 102 reveals such features as landed or unlanded landing tips 114a, critical spacing, and surface planarity.

Once the mirror is removed, the dimensions and spacing of all underlying device structures may be measured. A scanning electron microscope can be used for this type of inspection. In fact, an advantage of the invention is that the sub micron particles left after removing a mirror have a positive effect of making a target for de-stigmating a SEM, because they are small and round.

Figure 3:
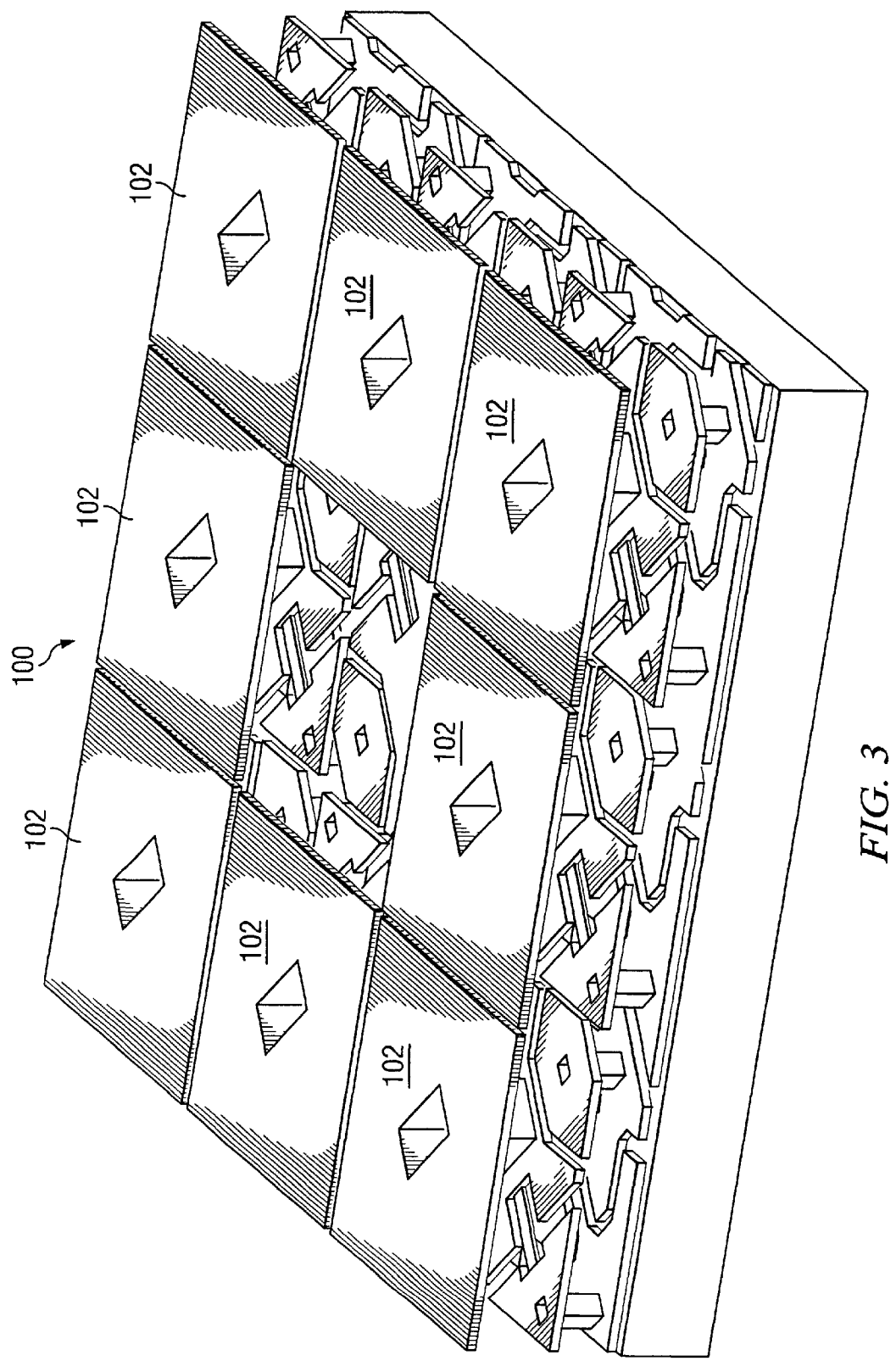
FIG. 3 illustrates a portion of a DMD array with the mirror of a single mirror element removed in accordance with the invention.

FIG. 3 illustrates how the mirror 102 of only a single mirror element 200 can be lasered off. Laser removal of a mirror can be achieved regardless of the location of the mirror element 200 in array 100. The mirror to be removed can be in the midst of other mirrors, or it can be on the edge of array 100. Furthermore, the mirror to be removed can be lasered off regardless of whether it is in a tilted or flat position.

Figure 4:
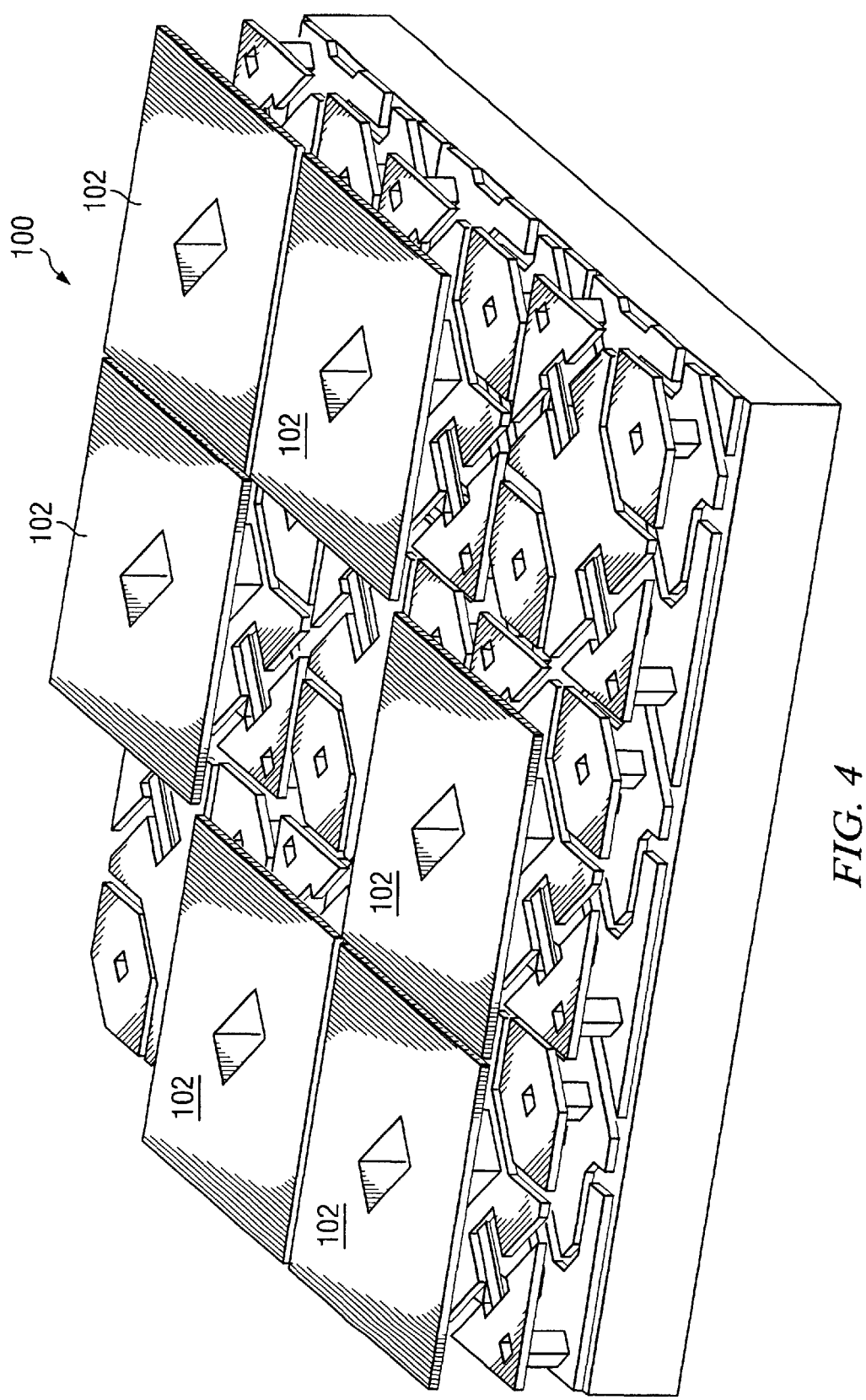
FIG. 4 illustrates a portion of a DMD array with a diagonal line of mirrors removed.

FIG. 4 illustrates the accuracy and repeatability of the lasering process. As illustrated, a diagonal line of mirrors has been removed.

Figure 5:
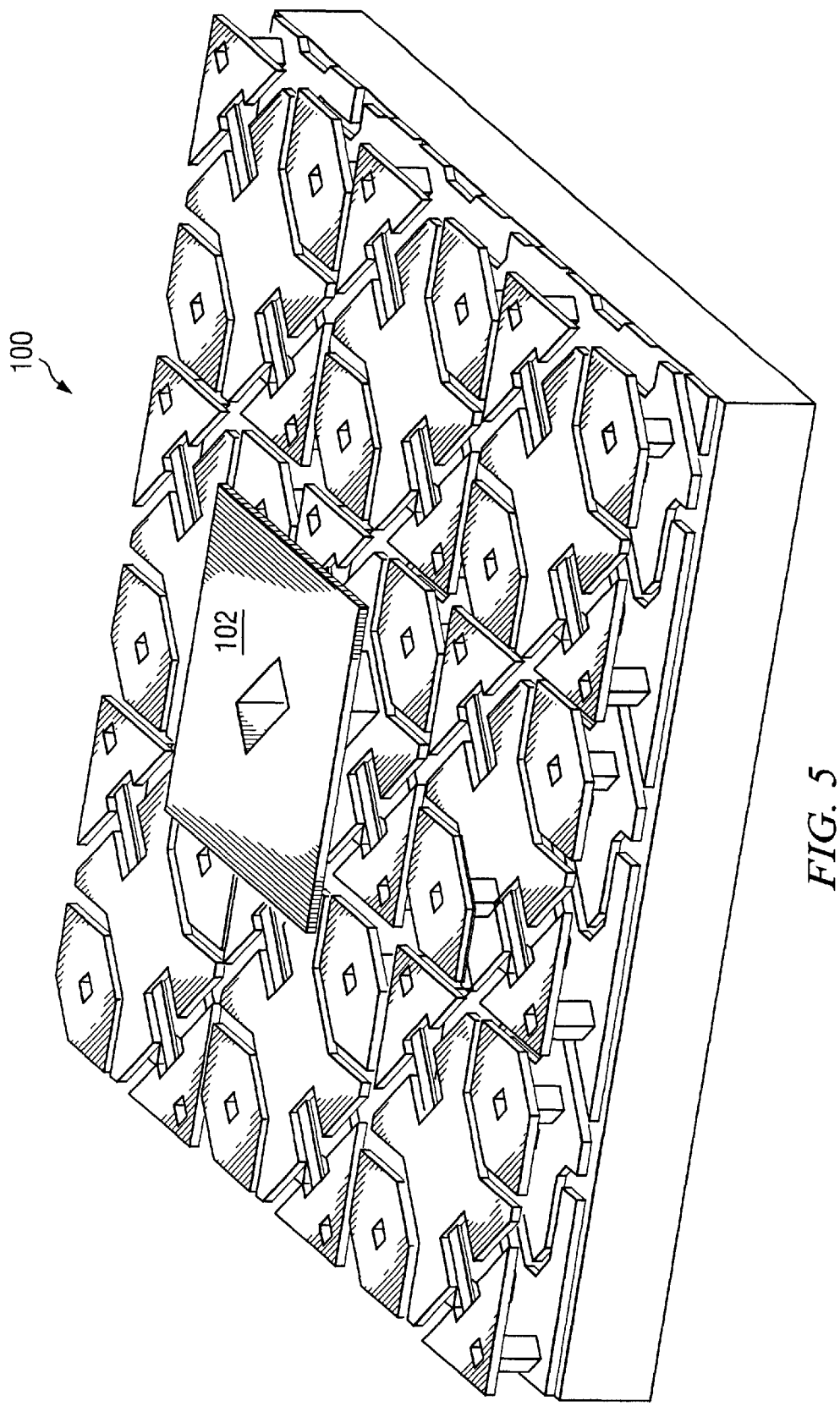
FIG. 5 illustrates a portion of a DMD array with the mirrors surrounding a mirror element removed.

FIG. 5 illustrates another approach to inspecting a mirror element 200. As illustrated, all mirrors that surround the target mirror have been lasered off. Now, the entire structure of the target mirror can be inspected.

Figures 6, 7:
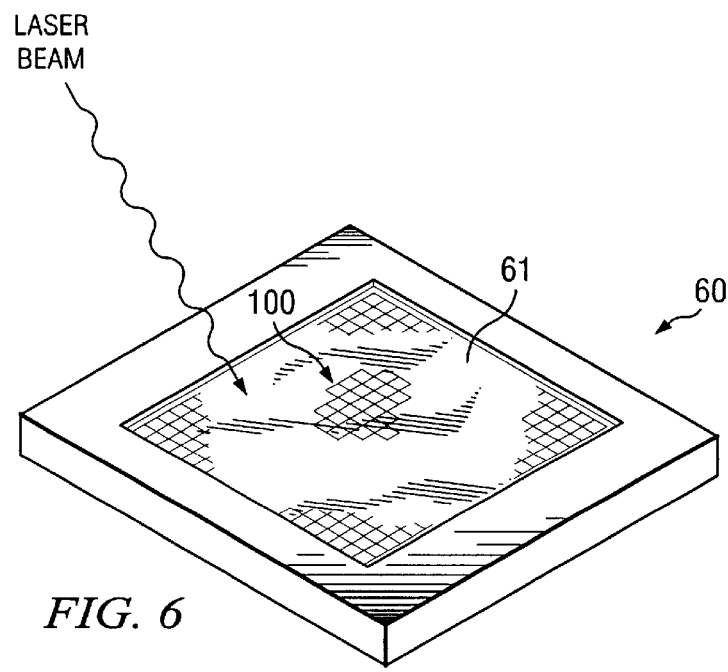
FIG. 6 illustrates how the laser may be used for mirror removal through the window of a DMD package.
FIG. 7 illustrates the results of auger analysis subsequent to mirror removal.

FIG. 6 illustrates a DMD array 100 packaged in a plastic housing, ready for commercial sale and use as a DMD package 60. A lid with a high-quality optical window 61 is welded to the top of the package 60 so that light may enter the window and be reflected by the mirror array 100 out of the window 61. If desired, a laser can be used to remove one or more mirrors through this window. In this manner, one or more mirrors can be removed while the DMD has not been contaminated and is well passivated.

Once the mirror is removed, various methods can be used to provide elemental analysis of a selected location of the understructure. An advantage of the auger (elemental profile) method is that the analysis can start at the surface and work down. Other analysis methods such as EDX (energy dispersive x-ray) analysis, could also be used.

FIG. 7 illustrates the results of auger analysis of several 1 micron spots on hinge 120. As illustrated, removal of mirror 102 permits this analysis to reveal the chemical composition of the hinge 120, which comprises proportions of chlorine, oxygen, fluoride, aluminum, silicon, and titanium.

Various types of lasers may be used for mirror removal. Both red and blue lasers have been successfully used. The laser power varies depending on several variables. For example, if lubricants such as PFDA have been used for the mirror array, a different power might be suitable. Other factors affecting power include the ambient temperature and humidity. In practical application, the laser power may be adjusted on a portion of the array not of interest, until the suitable power is determined, that is, until the power is adjusted so that the mirror is removed without affecting other structures of the array.

Other Embodiments

Although the present invention has been described in detail, it should be understood that various changes, substitutions, and alterations can be made hereto without departing from the spirit and scope of the invention as defined by the appended claims.

What is claimed is:

1. A method of inspecting a target mirror element of a MEMS mirror device, comprising the steps of:
   selecting one or more mirrors to be removed; and
   using a laser to remove the selected one or more mirrors.

2. The method of claim 1, wherein the mirror element is part of a digital micromirror array.

3. The method of claim 1, wherein the selecting step is performed by selecting the mirror of the target mirror element.

4. The method of claim 1, wherein the selecting step is performed by selecting neighbor mirrors of the target mirror element.

5. The method of claim 1, wherein the selecting step is performed by selecting a mirror in the midst of an array of mirror elements.

6. The method of claim 1, wherein the selecting step is performed by selecting a mirror on the periphery of an array of mirror elements.

7. The method of claim 1, wherein the selecting step is performing by selecting a single line of mirrors of an array of mirror elements.

8. The method of claim 1, wherein the selected one or more mirrors are supported on a support via, and wherein the step of using the laser further removes all or part of the support via.

9. The method of claim 1, wherein the mirror element is located under a transparent window, such that the step of using a laser is performed through the window.

10. The method of claim 1, further comprising the step of measuring structures under the mirror.

11. The method of claim 1, further comprising the steps of operating the structure underlying the mirror, and observing the operation.

12. A method of analyzing a target mirror element of a MEMS mirror device, comprising the steps of:
    selecting one or more mirrors to be removed;
    using a laser to remove the selected one or more mirrors; and
    performing an elemental analysis of the structure underlying the mirror.

13. The method of claim 12, wherein the elemental analysis is EDX analysis.

14. The method of claim 12, wherein the elemental analysis is auger analysis.

* * * * *